United States Patent
Shen et al.

(10) Patent No.: US 10,641,083 B2
(45) Date of Patent: May 5, 2020

(54) METHOD OF MONITORING FLUID FLOW FROM A RESERVOIR USING WELL TREATMENT AGENTS

(71) Applicant: Baker Hughes Incorporated, Houston, TX (US)

(72) Inventors: Dong Shen, The Woodlands, TX (US); Stephen J. Szymczak, Spring, TX (US); William H. Steiner, Spring, TX (US); Dora V. Galvan, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 536 days.

(21) Appl. No.: 15/172,015

(22) Filed: Jun. 2, 2016

(65) Prior Publication Data

US 2017/0350236 A1    Dec. 7, 2017

(51) Int. Cl.
*E21B 47/10*    (2012.01)
*E21B 43/14*    (2006.01)
(Continued)

(52) U.S. Cl.
CPC ............ *E21B 47/1015* (2013.01); *C09K 8/03* (2013.01); *C09K 8/524* (2013.01); *C09K 8/528* (2013.01);
(Continued)

(58) Field of Classification Search
CPC .................................................... C09K 8/60
See application file for complete search history.

(56) References Cited

U.S. PATENT DOCUMENTS 1,570,537 A    1/1926    Teitsworth
2,378,155 A    6/1945    Newsome
(Continued)

FOREIGN PATENT DOCUMENTS

CA    1262507    10/1989
EP    0540204 A2    5/1993
(Continued)

OTHER PUBLICATIONS

P.J.C. Webb Aea Technology PLC, T.A., et al; Revolutionary New Chemical Delivery System for Fractured, Gravel Packed and Prepacked Screen Wells; SPE 38164; 1997.
(Continued)

*Primary Examiner* — William D Hutton, Jr.
*Assistant Examiner* — Avi T Skaist
(74) *Attorney, Agent, or Firm* — John Wilson Jones; Jones Delflache LLP

(57) ABSTRACT

A method of treating a multi-zoned subterranean formation with composites having well treatment agents is disclosed. The well treatment agent treated in each zone is distinguishable. At least a portion of the well treatment agent is released from one of the composites into the well or formation. The formation of undesirable contaminants may be inhibited or prevented in the well or in the formation by the release of the well treatment agent from one or more of the composites. The well treatment agent also serves as a tracer. When fluid transported from the formation or well is collected, the source of the transported fluid may be determined by comparing a chemical or physical parameter of the well treatment agent with a working set of known taggants.

24 Claims, 1 Drawing Sheet

(51) Int. Cl.
  *C09K 8/524* (2006.01)
  *C09K 8/03* (2006.01)
  *C09K 8/536* (2006.01)
  *E21B 43/25* (2006.01)
  *C09K 8/528* (2006.01)

(52) U.S. Cl.
  CPC .............. *C09K 8/536* (2013.01); *E21B 43/14* (2013.01); *E21B 43/25* (2013.01)

(56) References Cited

U.S. PATENT DOCUMENTS

| | | |
|---|---|---|
| 3,179,170 A | 4/1965 | Burtch et al. |
| 3,283,817 A | 11/1966 | Roberts |
| 3,782,469 A | 1/1974 | Fulford |
| 3,850,248 A | 11/1974 | Carney |
| 3,987,850 A | 10/1976 | Fitch |
| 3,991,827 A | 11/1976 | Schall |
| 4,008,763 A | 2/1977 | Lowe, Jr. |
| 4,013,587 A | 3/1977 | Fischer et al. |
| 4,108,779 A | 8/1978 | Carney |
| 4,109,721 A | 8/1978 | Slusser |
| 4,264,329 A | 4/1981 | Beckett |
| 4,352,741 A | 10/1982 | Wernau |
| 4,390,456 A | 6/1983 | Sanchez et al. |
| 4,552,591 A | 11/1985 | Millar |
| 4,582,131 A | 4/1986 | Plummer et al. |
| 4,660,645 A | 4/1987 | Newlove et al. |
| 4,670,166 A | 6/1987 | McDougall et al. |
| 4,738,897 A | 4/1988 | McDougall et al. |
| 4,905,762 A | 3/1990 | Zilch |
| 4,986,353 A | 1/1991 | Clark et al. |
| 5,073,276 A | 12/1991 | Newlove et al. |
| 5,102,558 A | 4/1992 | McDougall et al. |
| 5,187,011 A | 2/1993 | Manalastas et al. |
| 5,224,543 A | 7/1993 | Watkins et al. |
| 5,225,123 A | 7/1993 | Torobin |
| 5,243,190 A | 9/1993 | Bandy et al. |
| 5,741,758 A | 4/1998 | Pakulski |
| 5,758,725 A | 6/1998 | Streetman |
| 5,892,147 A | 4/1999 | Garnes et al. |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 | 3/2003 | Reddy et al. |
| 6,613,899 B1 | 9/2003 | Kuzzee et al. |
| 6,645,769 B2 | 11/2003 | Tayebi et al. |
| 6,723,683 B2 | 4/2004 | Crossman et al. |
| 6,866,797 B1 | 3/2005 | Martin et al. |
| 7,028,776 B2 | 4/2006 | Kirk |
| 7,270,184 B2 | 9/2007 | Kolter et al. |
| 7,347,260 B2 | 3/2008 | Ferguson et al. |
| 7,380,606 B2 | 6/2008 | Pursley et al. |
| 7,419,937 B2 | 9/2008 | Rimmer et al. |
| 7,426,961 B2 | 9/2008 | Stephenson et al. |
| 7,459,209 B2 | 12/2008 | Smith et al. |
| 7,491,682 B2 | 2/2009 | Gupta et al. |
| 7,493,955 B2 | 2/2009 | Gupta et al. |
| 7,494,711 B2 | 2/2009 | Kaufman et al. |
| 7,560,690 B2 | 7/2009 | Stray et al. |
| 7,598,209 B2 | 10/2009 | Kaufman et al. |
| 7,686,081 B1 | 3/2010 | Becker |
| 7,896,078 B2 | 3/2011 | Xang et al. |
| 8,596,354 B2 | 12/2013 | Hartshorne et al. |
| 8,664,168 B2 | 3/2014 | Steiner |
| 8,853,619 B2 | 10/2014 | Preudhomme et al. |
| 9,010,430 B2 | 4/2015 | Darby et al. |
| 9,029,300 B2 | 5/2015 | Gupta |
| 9,102,860 B2 | 8/2015 | Cawiezel et al. |
| 9,874,080 B2 | 1/2018 | Gupta et al. |
| 9,976,070 B2 | 5/2018 | Darby et al. |
| 10,287,865 B2 | 5/2019 | Brannon et al. |
| 2002/0128157 A1 | 9/2002 | Bates et al. |
| 2003/0006036 A1 | 1/2003 | Malone et al. |
| 2003/0196799 A1* | 10/2003 | Nguyen ................ C09K 8/805 166/250.12 |
| 2004/0043906 A1 | 3/2004 | Heath et al. |
| 2004/0060702 A1 | 4/2004 | Kotlar et al. |
| 2004/0074646 A1 | 4/2004 | Kotlar et al. |
| 2004/0224155 A1 | 11/2004 | Barron et al. |
| 2004/0244969 A1 | 12/2004 | Koltar et al. |
| 2005/0022991 A1 | 2/2005 | Rao |
| 2005/0028976 A1 | 2/2005 | Nugyen et al. |
| 2005/0034868 A1 | 2/2005 | Frost et al. |
| 2005/0109087 A1* | 5/2005 | Robb ................ E21B 47/1015 73/53.01 |
| 2005/0115710 A1 | 6/2005 | Koltar et al. |
| 2006/0065396 A1 | 3/2006 | Dawson et al. |
| 2006/0091572 A1 | 5/2006 | Santra et al. |
| 2006/0124301 A1 | 6/2006 | Gupta |
| 2006/0124302 A1 | 6/2006 | Gupta |
| 2007/0036977 A1 | 2/2007 | Sinclair et al. |
| 2007/0095528 A1 | 5/2007 | Ziauddin et al. |
| 2007/0125987 A1* | 6/2007 | Hills ........................ C02F 5/12 252/408.1 |
| 2007/0173417 A1 | 7/2007 | Kaufman et al. |
| 2007/0202318 A1 | 8/2007 | Smith et al. |
| 2008/0035339 A1 | 2/2008 | Welton et al. |
| 2008/0035340 A1 | 2/2008 | Welton et al. |
| 2008/0053657 A1 | 3/2008 | Alary et al. |
| 2008/0058228 A1 | 3/2008 | Wilson |
| 2008/0058229 A1 | 3/2008 | Berkland et al. |
| 2008/0078547 A1 | 4/2008 | Sinclair et al. |
| 2008/0182765 A1 | 7/2008 | Pershikova et al. |
| 2008/0210421 A1 | 9/2008 | Wilson et al. |
| 2008/0217012 A1 | 9/2008 | Delorey et al. |
| 2008/0287324 A1 | 11/2008 | Pursley et al. |
| 2009/0025470 A1 | 1/2009 | Green et al. |
| 2009/0114247 A1 | 5/2009 | Brown et al. |
| 2009/0131285 A1 | 5/2009 | Wang et al. |
| 2009/0291861 A1 | 11/2009 | Sawdon |
| 2009/0308610 A1 | 12/2009 | Windebank et al. |
| 2009/0325825 A1 | 12/2009 | Gupta et al. |
| 2010/0059224 A1 | 3/2010 | Palamara et al. |
| 2010/0175875 A1 | 7/2010 | Becker et al. |
| 2010/0304418 A1 | 12/2010 | Moussavi et al. |
| 2010/0307745 A1* | 12/2010 | Lafitte ..................... C09K 8/62 166/250.12 |
| 2011/0146974 A1 | 6/2011 | Hartshorne et al. |
| 2012/0012326 A1 | 1/2012 | Darby et al. |
| 2012/0252706 A1 | 10/2012 | Steiner |
| 2012/0292025 A1 | 11/2012 | Stoll |
| 2012/0318515 A1 | 12/2012 | Cawiezel et al. |
| 2013/0029883 A1 | 1/2013 | Dismuke et al. |
| 2013/0126158 A1 | 5/2013 | Gupta et al. |
| 2015/0330197 A1 | 11/2015 | Brannon et al. |
| 2016/0030916 A1 | 2/2016 | Shen et al. |
| 2017/0226404 A1 | 8/2017 | Gupta |
| 2017/0350236 A1 | 12/2017 | Shen et al. |
| 2018/0134939 A1 | 5/2018 | Darby et al. |

FOREIGN PATENT DOCUMENTS

| | | |
|---|---|---|
| EP | 1277051 B1 | 8/2006 |
| GB | 2298440 | 9/1996 |
| GB | 2520018 | 5/2015 |
| WO | 99/36668 A1 | 7/1999 |
| WO | 99/54592 | 10/1999 |
| WO | 200011949 A1 | 3/2000 |
| WO | 2001081914 A1 | 11/2001 |
| WO | 2002040827 A1 | 5/2002 |
| WO | 2004106942 A2 | 12/2004 |
| WO | 2005/017313 A1 | 2/2005 |
| WO | 2006129258 A1 | 12/2006 |

(56) References Cited

FOREIGN PATENT DOCUMENTS

| WO | 2008032067 A1 | 3/2008 |
|---|---|---|
| WO | 2010007390 A2 | 1/2010 |
| WO | 2016014310 A1 | 1/2016 |

OTHER PUBLICATIONS

P.J.C. Webb Aea Technology PLC, T.A., et al; Economic and Technical Advantages of Revolutionary New Delivery System for Fractured and Gravel Packed Wells; SPE 38548; 1997.

P.J.C. Webb Aea Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hydraulic Fracturing for Reservoir Management Production Enhancement, Scale Control and Asphaltine Prevention; SPE 71655; 2001.

McInnich, et al; New Relationship Between Oil Company and Service Company Rejuvenates a Mature North Sea Gas Field; SPE 78327; 2002.

Szymczak, et al; Long-Term Scale Inhibition Using a Solid Scale Inhibitor in a Fracture Fluid; SPE 102720; 2006.

Gupta, et al; Solid Production Chemicals Added With the Frac for Scale, Paraffin and Asphaltene Inhibition; SPE 119393; 2009.

Gupta, et al; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

Weirich et al., Field Application of Chemically Treated Substrate in Pre-Packed Well Screen; SPE 141054; Society of Petroleum Engineers; Manama Bahrain, Mar. 2011.

Sasol Germany Gmbh; "Boehmite, High Purity Alumina and Hydrotalcite"; Sasol Germany GmbH; Hamburg Germany.

Sasol; "Aluminum Oxide, A1203"; Material Safety Data Sheet; version 1.2; Sasol; Hamburg Germany; Aug. 2007.

Carbo Ceramics "Carbo EconoProp"; Carbo Ceramics; Houston, Texas; 2010.

D.M. Frigo et al; Chemical Inhibition of Halite Scaling in Topsides Equipment; SPE 60191; 2000.

Berlin et al., "Engineered Nanoparticles for Hydrocarbon Detection in Oil-Field Rocks," SPE 141528 Apr. 11, 2011 (in 2 parts).

Nyhavn, et al. "Permanent Tracers Embedded in Downhole Polymers Prove Their Monitoring Capabilities in a Hot Offshore Well," SPE 135070, Sep. 19, 2010.

Fuller, et al., Applying Biochemistry Concepts to the Analysis of Oilfield Produced Fluids, SPE 124749, Oct. 2009.

Optidose (TM) 1000 Traceable Polymer, a Tool for Maintaining Maximum Heat Transfer, Technical Data Sheet, Jul. 2012, The Dow Chemical Co.

Accent (TM) Traceable Scale Inhibitor System, Sep. 2010, The Dow Chemical Co.

Himes, et al., Search4Oil, Comparative Study of Flowback Analysis Using Polymer Concentrations and Fracturing-Fluid Tracer Methods: A Field Study, Jul. 17, 2014.

\* cited by examiner

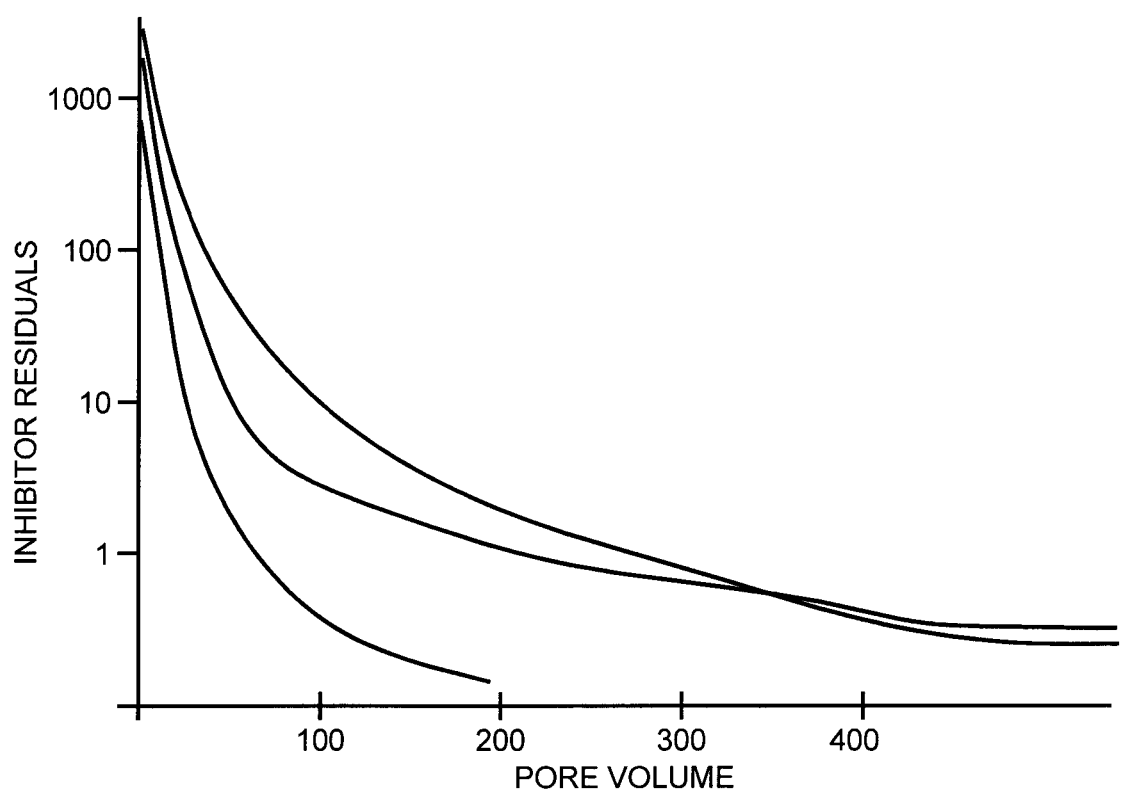

METHOD OF MONITORING FLUID FLOW FROM A RESERVOIR USING WELL TREATMENT AGENTS

This application claims the benefit of U.S. patent application Ser. No. 61/170,068, herein incorporated by reference.

FIELD OF THE DISCLOSURE

The disclosure relates to a method of monitoring a multiple zone reservoir using well treatment agents. The well treatment agent may have a taggant. The well treatment agent may be immobilized on a support to form a composite. A composite may also be formed by incorporating the well treatment agent into a porous particulate as well as by forming a shaped article incorporating the well treatment agent. The well treatment agent may be slowly released from the composite after being introduced into a targeted area and transported out of the reservoir. In order to identify the source of the transport fluid, it is necessary for the well treatment agents to be distinguishable.

BACKGROUND OF THE DISCLOSURE

Subterranean formations are typically characterized as having a plurality of production zones. During production of fluids from the well, it usually is desirable to establish communication with selected zones to prevent the inadvertent flow of fluids into a non-productive zone or a zone of diminished interest. Selective stimulation becomes pronounced as the life of the well declines and productivity of the well decreases.

Typically, a large amount of water is used during a stimulation operation. For instance, during a hydraulic fracturing operation, water may be pumped into fractures at pressures exceeding 3000 psi and at flow rates exceeding 85 gallons per minute. A horizontal well with a 4,500 foot lateral bore may require about 4 to 5 million gallons of water. The fluid which returns to the surface may be flowback water, produced water or produced oil or gas.

Flowback water typically is characterized by high salinity and dissolved solids. Included as dissolved solids are salts which are recovered from the formation. Such salts increase the natural salinity of water pumped into the well. Flowback water also often contains the same chemicals which are pumped into the well and often contains contaminants originating from rock formation water.

Produced water contains clay, dirt, metals and chemicals that may have been added during the treatment operation. The amount of produced water brought to the surface may be very high. For instance, an additional 10,000 to 30,000 bbl of produced water may flow for up to two years. The point at which flowback water becomes produced water is often difficult to distinguish, yet may be discerned from the chemistry of flowback water versus naturally occurring water produced by the formation.

Inefficiency in production often is the result of precipitated deposits which form in the formation during an operation. For instance, it is well known that undesirable deposits can precipitate from saturated oilfield waters in an oil or gas well. Such deposits lead to a restriction in production piping and result in plugging of reservoir flow paths. For instance, common mineral scales such as calcium carbonate, calcium sulfate, or barium sulfate can precipitate from produced water, precipitate from saturated oil or gas wells and create blockages in flow paths, especially in production tubulars such as well tubing and flow lines.

Reservoir Monitoring refers to the gathering and analysis of information from reservoirs during production. Such monitoring is used to assess the productivity of zones from which fluids are being produced. In addition, reservoir monitoring provides an understanding of the dynamics of hydraulic fracture placement and subsequent fluid flowback and clean up.

In the past, methods of monitoring produced fluids have used tracers (such as fluorinated benzoic acids) which have been placed in strategic areas within the well. See, for instance, U.S. Pat. Nos. 3,991,827; 4,008,763; 5,892,147 are U.S. Pat. No. 7,560,690. Such methods typically are only useful for a short time following placement of the tracer within the well. Further, most monitoring methods are restricted to near-wellbore production activity, are cumbersome and are not particularly cost effective. Alternatives have therefore been sought.

In addition, alternatives have been sought which more efficiently treat reservoirs by inhibiting the formation of undesirable deposits.

SUMMARY OF THE DISCLOSURE

The disclosure relates to a method of treating a multiple zone subterranean formation by introducing a first well treatment fluid in a first zone and a second well treatment fluid in a second zone of the formation. The first well treatment fluid and the second well treatment fluid contain a composite having a well treatment agent. The well treatment agent of the first well treatment fluid and the well treatment agent of the second well treatment fluid are different and are distinguishable by physical or chemical analysis. Fluid produced from the well and/or subterranean formation is transported from the well. The well treatment agent of the first treatment fluid and/or the well treatment agent of the second treatment fluid are released into the transported fluid. Contaminants are inhibited and/or prevented from being deposited within the well and/or formation by the release of well treatment agent from the composite. The well treatment agent also serves as a tracer. At least a portion of the transported fluid may then be collected and the well treatment agent of the first treatment fluid and/or second treatment fluid identified by physical or chemical analysis. The source of the transported fluid may thus be determined.

The disclosure further relates to a method of treating a subterranean formation having multiple zones. In this method, well treatment composites comprising a well treatment agent having a taggant are introduced into two or more of the multiple zones. At least a portion of the tagged well treatment agent may be released from one of the composites into the well or subterranean formation. The formation of undesirable contaminants may be inhibited or prevented in the well or in the formation by the release of the tagged well treatment agent from one or more of the composites. The tagged well treatment agent also serves as a tracer. When fluid transported from the formation or well is collected, the source of the transported fluid may be determined by comparing the detected taggant with a working set of known taggants. In order to identify the source, it is necessary for the tagged well treatment composites which are introduced in different zones to have distinct taggants.

Another embodiment of the disclosure relates to a method of determining the source of a fluid which is transported from a subterranean formation. The subterranean formation has multiple zones. In this embodiment, well treatment fluids having a composite of a tagged well treatment agent are introduced into two or more of the multiple zones. The taggant of the tagged well treatment agent introduced into one of the multiple zones is different from the taggant of the tagged well treatment agent introduced into another zone. At least a portion of the fluid transported out of the well is collected. The zone of the subterranean formation from which the transported fluid originates is determined by comparing the taggant in the transported fluid with a working set of known taggants.

In another embodiment of the disclosure, a method of inhibiting or preventing the deposition of contaminants within a subterranean formation or a well penetrating the subterranean formation and determining the source of a fluid transported from a subterranean formation with a single particulate is provided. In this embodiment, the subterranean formation has multiple zones penetrated by the well. A well treatment composite comprising a well treatment agent having a taggant is introduced into two or more of the multiple zones. The taggant of the tagged well treatment agent introduced in one zone is different from the taggant of the tagged well treatment agent introduced into another zone. During a well treatment operation, contaminants are inhibited or preventing from being deposited within the subterranean formation and/or into the well by disassociating the tagged well treatment agent from the composite. At least a portion of the fluid transported out of the well during or after completion of a well treatment operation is collected. The zone of the subterranean formation from which the transport fluid originates is then determined by comparing the taggant in the transport fluid with a working set of known taggants.

In another embodiment of the disclosure, a method of determining the source of a fluid transported from a well penetrating a multi-zone subterranean formation is provided. In this embodiment, well treatment fluids containing a composite are introduced into two or more of the multiple zones. The well treatment agents of the composites introduced to the multiple zones is different. At least a portion of fluid transported from the well is collected during or after completion of the well treatment operation. The zone of the subterranean formation from which the transported fluid originates is determined by detecting the well treatment agent in the transport fluid by a physical or a chemical detection method.

In another embodiment of the disclosure, a method of inhibiting or preventing the deposition of contaminants within a multi-zone subterranean formation or a well penetrating the formation is provided. In this method, a composite containing a well treatment agent is introduced into two or more of the multiple zones of the formation. The composite used to inhibit or prevent the deposition of contaminants in the formation or well is also used to determine the zone of the formation from which transported fluid returning or returned to the surface originates. The well treatment agent of the composites introduced into the two or more multiple zones is different. At in-situ reservoir conditions, the well treatment agent dissociates from the composite, thereby inhibiting or prevent the deposition of contaminants in the formation and/or well. The zone of the formation from which the transport fluid originates is determined by comparing the well treatment agent in the transported fluid by a chemical or physical method.

In another embodiment of the disclosure, a method of treating a multiple zone subterranean formation is provided where a first well treatment fluid is introduced in a first zone and a second well treatment fluid is introduced in a second zone of the formation. The well treatment agent of the first well treatment fluid and the well treatment agent of the second well treatment fluid are different and are distinguishable by physical or chemical analysis. Fluid produced from the well and/or subterranean formation is transported from the well. The well treatment agent of the first treatment fluid and/or the well treatment agent of the second treatment fluid are released into the transported fluid. Contaminants are inhibited and/or prevented from being deposited within the well and/or formation by the well treatment agent. At least a portion of the transported fluid may then be collected and the collected well treatment agent identified by physical or chemical analysis. The source of the transported fluid may thus be determined.

The well treatment agent, as well as composites containing the well treatment agent, may be a liquid or a solid form. The well treatment agent may be a calcium or magnesium salt or a salt of a mixture of calcium and magnesium.

The composite may be a well treatment agent immobilized onto a support. The well treatment agent may be adsorbed onto a porous particulate. The well treatment agent may also be absorbed within the interstitial spaces of a porous particulate.

The composite containing the well treatment agent may be shaped and compressed after being added to a binder.

The well treatment agent may contain a taggant.

In an embodiment, the fluid transported out of the well is produced water which contains the well treatment agent. The zone of the subterranean formation from which the produced water originates is determined by comparing the well treatment agent in the produced water by physical or chemical analysis.

In another embodiment, the fluid transported out of the well is flowback water. The zone of the subterranean formation from which the flowback water originates is determined by comparing the well treatment agent in the flowback water by physical or chemical analysis.

In another embodiment, the fluid transported out of the well is gas or oil produced from the subterranean formation. The zone of the subterranean formation from which the produced gas or oil originates is determined by comparing the well treatment agent in the produced gas or oil by physical or chemical analysis.

Physical or chemical may include inductively-coupled plasma discharge, UV/Vis spectrometer, high pressure liquid chromatograph (HPLC), gas chromatography-mass spectrometer, electrospray mass spectrometry, fluorescence spectrophotometry, solid phase extraction, hyamine analysis, strong anion exchange with hyamine analysis, gel permeation chromatography, atomic absorption spectroscopy, infrared, ultraviolet and mass spectroscopy, ultraviolet light, neutron activation analysis, electrochemical detection, radioactive analysis, x-ray analysis, PCR techniques combined with sequential analysis, neutron activation analysis, electron capture detection or a combination thereof Where the well treatment agent contains a taggant, the well treatment agent may be identified by identifying the taggant.

DESCRIPTION OF THE DRAWINGS

FIG. 1 represents the return curve for tagged well treatment agents set forth in Example 1.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying FIGURE. It should be understood that the description herein, being of example embodiments, is not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The methods defined herein include the use of composites having a well treatment agent. The well treatment agent may be tagged with a taggant. Unless indicated to the contrary, the term "well treatment agent" as used herein shall refer to well treatment agents not containing a taggant as well as to tagged well treatment agents.

The composite may be formed by immobilizing the well treatment agent onto a support. When the well treatment is tagged, the taggant may or may not be immobilized into the interstitial spaces of a support.

In an embodiment, a composite may be formed by adsorbing the well treatment agent onto an insoluble adsorbent or within the interstitial spaces of the insoluble adsorbent as well as by adsorbing the well treatment agent onto a porous substrate or absorbing the well treatment agent into the interstitial spaces of the porous substrate.

In an embodiment, the composites may be prepared by first adsorbing water onto a support or absorbing water within a support until the support appears wet. Where the well treatment agent is tagged, the taggant may be added after the support is wet. The product may then be dried at elevated temperatures (for instance, from about 220° F. to about 250° F.) until the percent moisture of the resulting product is less than 3%.

The well treatment agent may further be immobilized within a matrix. The matrix may be an emulsion, a polyepoxy or a polyvinyl alcohol. The matrix may also be a binder. In an embodiment, the combination of binder and the well treatment agent may be compressed to form a hardened particulate containing the well treatment agent.

The methods defined herein may further include the use of two or more chemically distinct well treatment agents which are neither formed into a composite nor tagged.

The well treatment agent (and the composites containing the well treatment agent) finds particular applicability in the treatment of oil wells, gas wells, water wells and geothermal wells.

Where the well treatment agent is tagged, the taggant joined with the well treatment agent to form the tagged well treatment agent must be compatible with fluids naturally present in the reservoir and within the rock itself as well as be compatible with the fluids injected into the reservoir as part of the formation treatment. (The term "joined" shall refer to the union of the taggant and well treatment agent to form a single particulate and shall include, but not be limited to, the bonding or complexing of the taggant onto the well treatment agent.) Further, the taggant must be susceptible to being readily detected qualitatively and analyzed quantitatively in the presence of the materials naturally occurring in the formation fluids.

The well treatment agent is typically soluble in either hydrocarbons or water. In an embodiment, however, a combination of oil soluble and water soluble well treatment agents may be simultaneously used.

The well treatment agent may be a solid or liquid.

Since multiple zones are being treated within the well, multiple well treatment agents are introduced into different zones. (The term "zone" as used herein may refer to separate formations within a well or separate areas within a single formation within the well.) When tagged well treatment agents are introduced into multiple zones, the taggant of the tagged well treatment agents is different such that the taggant of one tagged well treatment agent is identifiable from the taggant of another tagged well treatment agent. When the well treatment agents introduced into the multiple zones do not have a taggant, the well treatment agents may be identifiable by physical or chemical analysis.

Well treatment agents of the composites introduced into different zones must be distinguishable in order to identify the zone or area within the formation from which a transported fluid originates. Where the well treatment agents contain a taggant, the taggant of the tagged well treatment agent introduced into one zone must be unable to mask the characteristics of a taggant of a tagged well treatment agent introduced into another zone. Where the well treatment agent is not tagged, well treatment agents used in different zones must be distinguishable and identifiable from each other by physical or chemical analysis as disclosed herein.

Thus, for instance, a first tagged well treatment agent may be included in a first fluid introduced into a first zone of a formation. A second tagged well treatment agent may be included in a second fluid introduced into a second zone of a formation. The taggant of the first tagged well treatment and the taggant of the second well treatment fluid are different.

(It is understood that the terms "first" and "second" need not be sequential and only denote the order of addition of the fluids into the formation or the order of addition of zones treated in a formation. In other words, the first zone is merely penultimate to the second zone. Thus, for example, the "first zone" may refer to a third zone of a multi-zone formation and the "second zone" may refer to a sixth zone of a multi-zone formation; the "first treatment fluid" may be a fourth treatment fluid introduced while the "second treatment fluid" may be the eighth treatment fluid introduced.)

Taggants of tagged well treatment agents for use herein further should be relatively safe to handle, cost effective and relatively inert in a formation. In addition, they should be easily identifiable (preferably both qualitatively and quantitatively) in produced fluids.

Where the well treatment agent is tagged, typically the particle size of the taggant is between from about 0.001 microns to about 100 microns. In some instances, the particle size of the taggant is less than or equal to 0.05 microns. The amount of taggant in the tagged well treatment agent is normally from about 1 to 50 weight percent, preferably from about 1 to about 10 weight percent.

The composites defined herein may be employed with carrier or treatment fluids in order to facilitate placement of the composite to a desired location within the formation. In this regard, any carrier fluid suitable for transporting the composite may be used.

The carrier fluid may be a brine (such as a saturated potassium chloride or sodium chloride solution), salt water, fresh water, a liquid hydrocarbon, or a gas such as nitrogen or carbon dioxide.

The composite may further be advantageously employed in liquefied gas and foamed gas carrier fluids, such as liquid $CO_2$, $CO_2/N_2$, and foamed $N_2$ in $CO_2$ based systems.

In one embodiment, the composites of the well treatment agents described herein may be introduced or pumped into a well as neutrally buoyant particles in, for example, a saturated sodium chloride solution carrier fluid or a carrier fluid that is any other completion or workover brine known in the art.

Generally, fluids pumped into the well do not require excessive amounts of the well treatment agents. The amount of well treatment agent in the fluid is that amount sufficient to effectuate the desired result over a sustained period of time.

Typically, the minimum amount of well treatment agent in the fluid introduced into the zone of interest is that amount sufficient to permit detection within a produced fluid and to prevent, inhibit or control deposition of contaminants. In some instances, the amount of the well treatment agent in the fluid is between from about 15 ppm to about 100,000 ppm.

The amount of well treatment agent in the composite, in some cases, is between from about 0.05 to about 5 weight percent. The amount of composite present in the fluid is typically between from about 1 ppm to about 500,000 ppm.

Suitable taggants include dyes (such as phenoxazone dyes, fluroescein, pyridinium betaines dyes, solvatochromatic dyes, Oregon Green, Cascade Blue, Lucifer yellow, Auramine O, tetramethylrhodamine, pysranine, sulforhodamines, hydroxycoumarins; polysulfonated pyrenes; cyanines, hydroxylamines, neutral red, acridine orange), gases (such as helium and carbon dioxide); acids (such as picric acid and salicylic acid) or salts thereof; ionizable compounds (such as those which provide ammonium, boron, chromate, etc., ions); and substantially non-radioactive metals, substantially non-radioactive metal oxides, substantially non-radioactive metal sulfates, substantially non-radioactive metal carbonates, substantially non-radioactive metal phosphates, substantially non-radioactive metal salts of organic acids, phosphorescent pigments, fluorescent pigments, photoluminescent pigments, oil soluble dyes, oil dispersible dyes and oil dispersible pigments; isotopes; genetically or biologically coded materials such as antibodies/antigens; microorganisms; minerals; and high molecular weight synthetic and natural compounds and polymers (such as oligonucleotides, perfluorinated hydrocarbons like perfluoro butane, perfluoro methyl cyclopentane and perfluoro methyl cyclohexane). According to this embodiment, the phosphorescent, fluorescent, or photoluminescent pigments may be prepared from materials well known to those skilled in the art including but not limited to alkaline earth aluminates activated by rare earth ions, zinc sulfide phosphors, aluminate phosphors, zinc silicate phosphors, zinc sulfide cadmium phosphors, strontium sulfide phosphors, calcium tungstate phosphors and calcium sulfide phosphors.

Suitable metals may be selected from Groups I to VIII of the Periodic Table of the elements as well as the lanthanide series rare earth metals so long as the metals are compatible with the carrier fluid. Preferred metals include gold, silver, copper, aluminum, barium, beryllium, cadmium, cobalt, chromium, iron, lithium, magnesium, manganese, molybdenum, nickel, phosphorus, lead, titanium, vanadium and zinc as well as derivatives thereof including oxides, phosphates, sulfates, carbonates and salts thereof.

The taggant may also be a chelate, such as ethylenediaminetetraacetic acid (EDTA)) or a salt thereof. U.S. Pat. No. 4,264,329, herein incorporated by reference, discloses acceptable metal chelates formed by reacting aryl substituted ethylenediaminetetraacetic acid and a metal ion selected from the consisting of lead, cadmium and zinc. Such chelates react with fluorogenic agents, such as fluorescamine and o-phthalaldehyde. Fluorescence spectroscopy may be then used to detect the chelate.

Taggants may further be chemically modified such that, when joined with the well treatment agent, they are less mobile. For example, taggants may be chemically modified in order that they may be more effectively linked to a well treatment agent. The joining of a taggant to a well treatment agent may be done by any method conventionally known in the art.

Where a tagged well treatment agent is used, the well treatment agent and/or taggant of the tagged well treatment agent may be a solid or liquid. The well treatment agent to which the taggant is joined is preferably a liquid material. If the well treatment agent and/or taggant are a solid, it may be dissolved in a suitable solvent, thus making it a liquid prior to the joining of the taggant with the well treatment agent.

In an exemplary embodiment, composites having the well treatment agent are used to inhibit the formation of undesired contaminants, control the formation of undesired contaminants as well as retard the release of undesired contaminants into the well. For instance, the composite may be used in completion or production services. The composites may be used in the well to remove undesired contaminants from or control the formation of undesired contaminates onto tubular surface equipment within the wellbore.

The well treatment agent may slowly be released into the produced fluid as it is solubilized.

In a preferred embodiment, the well treatment agent is a corrosion inhibitor, scale inhibitor, paraffin inhibitor, gas hydrate inhibitor, salt formation inhibitor or an asphaltene dispersant as well as mixtures thereof. The well treatment agent may thus be used to control and/or prevent the undesired formation of salts, paraffins, gas hydrates, asphaltenes as well as corrosion in formations or on surface equipment.

Further, other suitable well treatment agents may be foaming agents, oxygen scavengers, demulsifying agents (both water-in-oil and oil-in-water), $H_2S$ scavengers, biocides and surfactants as well as other agents wherein slow release of a inhibitor into a production well is desired.

In a preferred embodiment, the composite contains a scale inhibitor which effectively inhibits, controls, prevents or treats the formation of inorganic scale formations being deposited in subterranean formations. The composites are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

Suitable well treatment agents as scale inhibitors are anionic.

Preferred well treatment agents include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type well treatment agents are often preferred in light of their effectiveness to control scales at relatively low concentration. Polymeric well treatment agents, such as polyacrylamides, salts of acrylamidomethyl propane sulfonate/acrylic acid copolymer (AMPS/AA), phosphinated maleic copolymer (PHOS/MA) or sodium salt of polymaleic acid/acrylic acid/acrylamidomethyl propane sulfonate terpolymers (PMA/AMPS), are also effective. Sodium salts are preferred.

Further, the scale inhibitor may be an amino trimethylene phosphonic acid (ATMP), 1-hydroxy ethylidene-1,1-diphosphonic acid (HEDP), 2-phosphonobutane-1,2,4-(tricarboxylic acid (PBTC), 2-hydroxyethyl-amino-bis(methylene-phosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTMPM), bis (hexamethylene triamine penta (methylene phosphonic acid) (BHPMP), polyamino polyether methylene phosphonate (PAPEMP) or a salt thereof; phosphino-polycarboxylate (PPCA), polyacrylate (PAA), polymaleic acid (PMA), an acrylic copolymer, sulfonate polyacrylate copolymer, polyvinyl sulfonate, carboxymethyl inulin, polyaspratates and mixtures thereof.

Further useful, especially for brines, are chelating agents, including diethylenetriaminepentamethylene phosphonic acid and ethylenediaminetetra acetic acid.

The well treatment agent may further be a salt inhibitor. Suitable salt inhibitors are those formed by joining a taggant with any of the fructans or fructan derivatives, such as inulin and inulin derivatives, as disclosed in U.S. Pat. No. 7,977,283, herein incorporated by reference. Other suitable salt inhibitors include potassium ferrocyanide, nitrilotriacetic acid and nitrilotriacetamide.

Suitable paraffin inhibitors are ethylene/vinyl acetate copolymers, acrylates (such as polyacrylate esters and methacrylate esters of fatty alcohols), and olefin/maleic esters.

Exemplary corrosion inhibitors include but are not limited to, fatty imidazolines, alkyl pyridines, alkyl pyridine quaternaries, fatty amine quaternaries and phosphate salts of fatty imidazolines.

Exemplary gas hydrate inhibitors include, but not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene inhibitors include, but not limited to, fatty ester homopolymers and copolymers (such as fatty esters of acrylic and methacrylic acid polymers and copolymers) and sorbitan monooleate.

Exemplary demulsifying agents are condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are those prepared from a well treatment agent selected from oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Suitable foaming agents are oxyalkylated sulfates or ethoxylated alcohol sulfates, or mixtures thereof.

Exemplary surfactants are cationic, amphoteric, anionic and nonionic surfactants. Included as cationic members are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable well treatment agents joined with a taggant to form a surfactant include a quaternary group include quaternary ammonium halide or quaternary amine, such as quaternary ammonium chloride or a quaternary ammonium bromide. Included as amphoteric surfactants are those prepared by joining a taggant with glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers are triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

Composites of Solid Adsorbents.

The well treatment agent may be adsorbed onto a support such, as a water-insoluble adsorbent, to form a composite. At least a portion of the well treatment agent may further be absorbed into interstitial spaces of the support. The well treatment agent may be slowly released from the adsorbent upon introduction of the composite into the formation. The controlled slow release of the well treatment agent may be dependent upon the surface charges between the well treatment agent and support which, in turn, may be dependent on the adsorption/desorption properties of the well treatment agent to adsorbent, pH variations, salinity, hydrocarbon composition, temperature, and pressure.

Where the support is a water-insoluble adsorbent, it may be of various kinds of commercially available high surface area materials having the affinity to adsorb the desired well treatment agent. Typically, the surface area of the adsorbent of the composite is between from about 1 $m^2$/g to about 100 $m^2$/g.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

Adsorption of the well treatment agent onto the adsorbent reduces (or eliminates) the amount of well treatment agent required to be in solution. Since the well treatment agent is adsorbed onto a substrate, only a small amount of well treatment agent may be released into the aqueous medium.

The weight ratio of well treatment agent to water-insoluble adsorbent is generally between from about 90:10 to about 10:90.

The composite may be prepared by adding the well treatment agent to the adsorbent and mixing until the well treatment agent is readily adsorbed and/or absorbed. The product may then be dried at elevated temperatures (for instance, from about 220° F. to about 250° F.) until the percent moisture of the resulting product is less than 3%. Suitable methods of preparing well treatment agents adsorbed and/or absorbed onto a support, such as a water-insoluble adsorbent, are disclosed in U.S. Pat. Nos. 7,491,682; 7,493,955; 7,977,283; and 8,664,168, all of which are herein incorporated by reference.

The composite has limited solubility in water (when produced water is being detected or measured) or hydrocarbons (when produced hydrocarbons are being detected or measured). When placed into a production well, the well treatment agent slowly dissolves at a generally constant rate over an extended period of time in the water or oil which is contained in the formation. The controlled slow release of the well treatment agent is dependent upon the surface charges between it and the adsorbent which, in turn, is dependent upon the adsorption, absorption and desorption properties of the well treatment agent to adsorbent.

Shaped Composites

The well treatment agent may be immobilized in a matrix or binder. In a preferred embodiment, the well treatment agent may be mixed with a binder and then compressed into a shaped article. In an embodiment, the composite described in the paragraphs above (wherein the well treatment agent is adsorbed and/or absorbed onto a support) may be admixed with the binder.

Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the well treatment agent to form the shaped compressed composite is typically from about 0.5 to about 50, preferably from about 1 to about 5 percent based on the total weight of the binder and well treatment agent prior to compression.

The shaped particulates may be produced by procedures known in the art. Typically the shaped particulates are formed by combining the well treatment agent and, optional, weighting agent, with a binder and then compressing the mixture in a mold of the desired shape or extruding the mixture into its desired shape.

Exemplary of the process for making the shaped compressed composite is to combine the well treatment agent or a composite (such as that prepared in accordance with the teachings set forth in U.S. Pat. No. 7,493,955 or 7,494,711) with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

Methods of making the shaped composites are further disclosed in U.S. Patent Publication No. 2012/0012326, herein incorporated by reference.

The shaped composites may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed composite, protect the shaped composite from harsh environmental conditions, protect the shaped composite from rupturing as it is lowered into the well and to lengthen the time of release of the tagged well treatment agent from the shaped compressed composite. The coating layer may be applied to the shaped composite by mixing the shaped composite and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed composite. Alternatively, the coating layer may also be applied as a spray in a solvent based coating on the shaped compressed composite and then dried to remove the solvent.

The shaped compressed pellet may be carried into a zone of interest. The well treatment agent is slowly released from the shaped compressed composite after being introduced into a targeted area in the well. The targeted area may be a site in the well where deposits have already formed or a location in the well where it is desirable for deposits not to form. The shaped compressed composite provides a continuous supply of the well treatment agent into the targeted area.

The shaped compressed composite is preferably a pellet and may be in the form of a sphere, cylinder, rod or any other shape which allows for the slow release of the taggant into the targeted area. In some applications, the shaped compressed composite are cylindrically shaped having a length of about 0.5 inch to about 6 inches, preferably from about 1 inch to about 2 inches and a diameter of from about 0.25 inch to about 4 inches, preferably from about 0.5 inch to about 1 inch. The specific gravity of the shaped compressed composite is generally between from about 1.1 to about 3. In a preferred embodiment, the specific gravity of the shaped compressed composite is between from about 2 to about 2.5.

Composite of Porous Particulates.

Suitable composites also include those composed of a porous particulate and at least one well treatment agent. Typically, the particle size of the porous particulate is between from about 0.3 mm to about 5 mm, preferably between from about 0.4 to about 2 mm. The porosity and permeability of the porous particulate is such that the well treatment agent may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, Ga.), for measuring the internal porosity of the particulate and the interstitial volume (of a pack) may be used to determine the porosity of the porous particulate. Generally, the amount of well treatment agent in the composite is from about 0.05 to about 5 (preferably from about 0.1 to about 2) weight percent based upon the total weight of the composite.

Examples of types of materials suitable for use as porous particulates include particulates having a porous matrix. The porous particulates are generally spherical and insoluble in well fluids under subterranean conditions, such as at temperatures less than about 250° C. and pressures less than about 80 MPa. Since the tagged well treatment agents employed in the composites are capable of being absorbed into the interstitial spaces of the porous particulates, they may be slowly released from the porous particulates into produced fluids. Produced fluids may therefore be exposed to a continuous supply of well treatment agent.

Suitable as porous particulates are those particulates set forth in U.S. Pat. Nos. 5,964,291 and 7,598,209, herein incorporated by reference. For instance, the porous particulate of the composite may be any naturally occurring or manufactured or engineered porous ceramic particulate, as well as any organic polymeric material, that has an inherent and/or induced porosity. Such porous particulates may exhibit the requisite physical properties, such as particle characteristics, desired strength and/or apparent density, to fit particular downhole conditions, including those common in hydraulic fracturing and sand control operations.

Suitable as inorganic ceramic materials are alumina, magnetic glass, titanium oxide, zirconium oxide, silicon carbide, aluminosilicates and other silica-based materials. Examples of non-natural porous particulate materials include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Suitable polymeric materials for use as the porous particulate include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

The composites may be prepared by conventional processes, such as electrofusion, spray-drying and pelletization. In a preferred embodiment, the composites are prepared by placement of the porous particulate into a dilute solution or suspension of the well treatment agent and permitting the porous particulate to imbibe the well treatment agent.

Calcined Metal Oxides

The composite may further be composed of a well treatment agent and a calcined metal oxide, such as those disclosed in U.S. Patent Publication No. 2012/0273197. Such composites include those where a well treatment agent is adsorbed onto a nano-sized calcined porous substrate of high surface area. The well treatment agent (or tagged well treatment agent) is slowly released from the adsorbent.

The porosity and permeability of the calcined porous substrate is such that the well treatment agent may also be absorbed into the interstitial spaces of the porous substrate. Typically, the surface area of the calcined porous substrate is between from about 1 $m^2/g$ to about 10 $m^2/g$, preferably between from about 1.5 $m^2/g$ to about 4 $m^2/g$, the diameter of the calcined porous substrate is between from about 0.1 to about 3 mm, preferably between from about 150 to about 1780 micrometers, and the pore volume of the calcined porous substrate is between from about 0.01 to about 0.10 cc/g. The porous metal oxide is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The adsorbent may be prepared by:

(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;

(b) introducing the mixture in dispersed form into a water-immiscible liquid having a temperature of from about 60° to 100° C., whereby gel particles are formed;

(c) aging the gel particles in the liquid at the temperature and subsequently in an aqueous base, such as an aqueous ammonia solution;

(d) recovering the aged particles; and then (e) calcining the recovered particles.

During calcination, the additive component is removed. The calcined particles have a lower bulk density when the additive component is present during calcinations than when the additive component is not present. Typically, the bulk density of the composite is between from about 75 to about 150 lb/ft³. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the $SiO_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetraamine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

Generally, the amount of well treatment agent in the composite is from about 0.05 to about 5 (preferably from about 0.1 to about 2) weight percent based upon the total weight of the composite. The concentration of the well treatment agent in the well is between from about 1 to about 50 ppm and may be as low as 1 ppm. Such small amounts of well treatment agents may be sufficient for up to 1,000 pore volumes.

The composite containing the well treatment agent is carried into the well and/or formation in a water-based or oil-based carrier fluid. Water-based carrier fluids include fresh water and brine. Oil-based carrier fluids include liquid hydrocarbons such as diesel, kerosene, jet fuel, crude oil, and condensate as well as synthetic fluids like esters, linear α-olefins, poly-α-olefins, internal olefins, paraffins, linear alkyl benzenes, esters and acetals.

In addition, the carrier fluid may be a gas such as nitrogen or carbon dioxide.

In one embodiment, the composite may be introduced or pumped into a well as neutrally buoyant particles in the carrier fluid.

The fluid may be gelled or non-gelled. The fluid may further include gelling agents, cross-linking agents, gel breakers or mixtures thereof.

The composites defined herein enable measurement of formation and/or water (including injection water) from various zones in a hydrocarbon reservoir. For instance, when used in multiple zones in a hydraulic fracturing operation, the composites inform the operator of zones of reduced productivity. Further, the presence of dispersed oil in produced water may be detected using the composites defined herein at less than 5 ppm.

In addition to preventing and/or inhibiting the formation of precipitates within the well or subterranean formation, the composites described herein make it possible to distinguish between produced water, formation water and flowback water.

As fluid passes through or circulates around the composites, the well treatment agent slowly dissolves over a generally constant rate over an extended period of time in the water or hydrocarbons which are contained in the formation and/or well. Thus, the composites are characterized by time-release capabilities of the well treatment agents which permit a continuous supply of the well treatment agent into the fluid transported from the well.

Generally, the lifetime of the composite of a single treatment after it is introduced into the formation is between six months and twelve months and may be in excess of three or five years depending upon the volume of fluid produced in the production well and the amount of well treatment agent in the composite. Gradual dissolution of the well treatment agent insures that they are available to produced fluids for extended periods of time. Such small amounts of well treatment agents may be sufficient for up to 1,000 pore volumes. Costs of operation are therefore significantly lowered.

The well treatment agent may be released from the composite into a solubilizing fluid within the formation or the well. For example, water soluble well treatment agents may remain intact on calcined porous metal oxide in the absence of water flow and slowly released in the presence of water. Hydrocarbon soluble well treatment agents may remain intact on the calcined porous metal oxide until they are slowly desorbed into the hydrocarbon phase of produced fluid.

Fluids may be transported out of the well and evaluated and the identity of the well treatment agent determined. Samples of the fluid containing the well treatment agent may be analyzed by various means in order to determine which zone of the subterranean formation the fluid originates.

The method may be used for monitoring different zones in oil and gas production wells, determining the sites of flowback water and produced water and also for detection or early warning of phenomena such as water breakthrough. The method may also be used to determine the zone in which gas or oil has been produced from the formation.

Upon production of fluid from the well, the produced fluid can be analyzed to determine productivity within the zone. For instance, a composite containing a tagged well treatment agent or an untagged well treatment fluid may be a component of a fracturing fluid or a spearhead fluid. The well treatment agent may be slowly released into the zone in which it has been pumped. Analysis of oil or gas produced from the zone of introduction may be determined after return of the oil or gas to the surface.

In addition to their use in hydraulic fracturing, the composites may be included in fluids used in well treating applications near wellbore and may be directed toward improving wellbore productivity and/or controlling the production of formation sand. Particular examples include gravel packing and "frac-packs." Typical gravel packing and frac packing methods.

The composites may also be used to monitor oil and gas for flow assurance and for maintaining regulatory compliance. The ability to analyze the fluids on-site, quickly and frequently, further assists operators to detect flow assurance, asset integrity and process problems early enabling them to take preventative action to minimize the risks of production loss and to adapt the treatment operation.

Since the well treatment agent may be detected in recovered produced fluids, the method described herein does not require downhole equipment for detection. Typically, fluids transported out of the well are evaluated and the identity of the well treatment agent is determined by comparing a chemical or physical parameter of the well treatment agent with a known parameter or "working set".

Detection and monitoring of well treatment agents within produced fluids may be, for instance, by visual inspection, chemical analysis, standard spectroscopy methods such as atomic absorption spectroscopy, infrared, ultraviolet and mass spectroscopy, spectrophotometric methods, chromatography (including liquid chromatography), ultraviolet light, fluorescence spectroscopy such as X-ray fluorescence spectroscopy, neutron activation analysis, electrochemical detection, infrared, radioactive analysis, x-ray analysis, PCR techniques combined with sequential analysis, neutron activation analysis, electron capture detection or optical fibers.

The selected detection method may be based on the properties of the taggant in the transported fluid. For instance, where the taggant is an aromatic compound, the method of detection is preferably by ultraviolet light. Where the taggant exhibits fluorescence, the detection method may be by fluorescence spectroscopy. Further, untagged well treatment agents may be detected by any of the methods described above, typically by chemical analysis, spectroscopy methods and chromatography.

In a preferred method, the fluid may be analyzed by inductively-coupled plasma (ICP) discharge wherein a sample of the fluid is nebulized within an ICP spectrometer and the resulting aerosol is transported to an argon plasma torch located within the ICP spectrometer. The ICP spectrometer measures the intensities of element-specific atomic emissions produced when the solution components enter the high-temperature plasma. A computer within the ICP spectrometer accesses a standard calibration curve to translate the measured intensities into elemental concentrations. Depending upon the ICP spectrometer, the degree of sensitivity may be as low as 1 to 5 parts per million.

Where the well treatment agent is adsorbed onto a support or absorbed into the interstitial spaces of a support, the well treatment agent may be reactivated or recharged with fresh well treatment agent after at least a portion of the well treatment agent has been depleted. Exemplary processes for reactivation or recharging are disclosed in U.S. Pat. No. 7,686,081 and U.S. Patent Publication no. 2010/0175875, both of which are herein incorporated by reference. In an exemplary procedure, an initial charge of the composite may be injected into the well during the well treatment operation, such as by continuous injection, high pressure pumping, etc. Additional amount of fluid containing the well treatment agent may be injected into the formation anytime after the initial charge of well treatment agent in the composite has been at least partially depleted. Typically, the additional well treatment agent is introduced when the well treatment agent adsorbed onto the support or within the interstitial spaces of the composite been substantially depleted and the performance level of the well treatment agent has become unacceptable. The injection of additional well treatment agent may be carried out in the same manner by which the initial composite was charged into the well or any other conventional method of injecting fluids into a well of an oil or gas well. After injection, the well may be pressurized for a time and under conditions sufficient to reactivate the well treatment agent onto the support or within the interstitial spaces of a porous particulate.

Example

The following is illustrative of an embodiment of the disclosure.

Tagged well treatment agents were prepared using carboxymethyl inulin tagged with a chelate and an antibody and a control. Approximately 55 grams 20/40 Ottawa white frac sand and 1.1 grams of each of the dried tagged well treatment agents were packed into a 35 cm length stainless steel column having an inner diameter of 1.08 cm. The pore volume of the column was approximately 12 milliliters. The column was eluted with a synthetic brine of 0.025 mol/L calcium chloride, 0.015 mol/L of sodium bicarbonate and 1 mol/L sodium chloride while being sparged with 100% carbon dioxide at 60° C. wherein the flow rate was 120 ml/hour which corresponded to 275 feet/day linear flow velocity. The effluent solution was collected and the tagged was identified using fluorescence. The taggant was identified with a working set of taggants. The curves illustrated in FIG. 1 demonstrate identification of the tagged well treatment agent by fluorescence.

Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

What is claimed is:

1. A method of determining the source of a produced fluid from a multiple zone subterranean formation penetrated by a well comprising:
  (a) introducing a first well treatment fluid in a first zone and a second well treatment fluid in a second zone of the subterranean formation, wherein the first well treatment fluid and the second well treatment fluid each contain a composite comprising a well treatment agent having a taggant joined thereto and wherein either:
    (i) the composite of the first well treatment fluid comprises the tagged well treatment agent adsorbed onto a water-insoluble adsorbent and/or the composite of the second well treatment fluid comprises the tagged well treatment agent adsorbed onto a water-insoluble adsorbent;
    (ii) the composite of the first well treatment fluid comprises the tagged well treatment agent immobilized on a support and/or the composite of the second well treatment fluid comprises the tagged well treatment agent immobilized on a support; or
    (iii) the composite of the first well treatment fluid comprises the tagged well treatment agent immobilized on or within a porous particulate and/or the composite of the second well treatment fluid comprises the second tagged well treatment agent immobilized on or within a porous particulate;
  and further wherein the taggant joined to the well treatment agent of the composite of the first well treatment fluid and the taggant joined to the well treatment agent of the composite of the second well treatment fluid are different and distinguishable by physical or chemical analysis;
(b) releasing the tagged well treatment agent from the composite of the first treatment fluid and/or the composite of the second treatment fluid;
(c) inhibiting and/or preventing the deposition of contaminants within the well and/or subterranean formation by the released tagged well treatment agent of step (b);
(d) transporting produced fluid from the well and/or subterranean formation, the transported produced fluid containing at least a portion of the released tagged well treatment agent of step (b);
(e) collecting at least a portion of the transported produced fluid;
(f) detecting the tagged well treatment agent of the first treatment fluid and/or second treatment fluid in the collected fluid by physical or chemical analysis of the taggant; and
(g) determining the source of the collected fluid from the detected taggant.

2. The method of claim 1, wherein the well treatment agent of the tagged well treatment agent of the composite of the first well treatment fluid and the well treatment agent of the tagged well treatment agent of the composite of the second well treatment fluid are different.

3. The method of claim 1, wherein the composite of the first well treatment fluid and the composite of the second well treatment fluid differ only by the taggant of the tagged well treatment agent.

4. The method of claim 1, wherein the tagged well treatment agent in the collected fluid is detected by comparing the taggant of the tagged well treatment agent in the collected fluid with a working set of known taggants.

5. The method of claim 1, wherein the composite of the first well treatment fluid comprises the tagged well treatment agent adsorbed onto a water-insoluble adsorbent and/or the composite of the second well treatment fluid comprises the tagged well treatment agent adsorbed onto a water-insoluble adsorbent.

6. The method of claim 1, wherein the transported produced fluid is flowback water and further wherein the zone of the subterranean formation from which the flowback water originates is determined by identifying the taggant of the tagged well treatment agent in the flowback water by physical or chemical analysis.

7. The method of claim 1, wherein the transported produced fluid is produced water and further wherein the zone of the subterranean formation from which the produced water originates is determined by identifying the taggant of the tagged well treatment agent in the produced water.

8. The method of claim 1, wherein the transported produced fluid is gas or oil produced from the subterranean formation and further wherein the zone of the subterranean formation from which the produced gas or oil originates is determines by identifying the taggant of the tagged well treatment agent in the produced gas or oil.

9. The method of claim 1, wherein the well treatment of the tagged well treatment agent of the first well treatment fluid and/or the second well treatment fluid is a scale inhibitor, paraffin inhibitor, salt inhibitor or any combination thereof.

10. The method of claim 1, wherein the well treatment agent of the tagged well treatment agent of the first treatment fluid and/or second treatment fluid is detected by atomic absorption spectroscopy, infrared spectroscopy, ultraviolet spectroscopy, mass spectroscopy, chromatography, fluorescence spectroscopy, neutron activation analysis, electrochemical detection, radioactive analysis, x-ray analysis, PCR techniques combined with sequential analysis, electron capture detection and inductively-coupled plasma discharge.

11. The method of claim 1, wherein the taggant of the tagged well treatment agent of the first well treatment fluid and/or the taggant of the tagged well treatment agent of the second well treatment fluid is selected from the group consisting of dyes, gases, acids, ionizable compounds, non-radioactive metals, phosphorescent pigments, fluorescent pigments, photoluminescent pigments, oil dispersible pigments, isotopes; genetically or biologically coded materials, microorganisms, minerals and Groups I to VIII metals.

12. The method of claim 1, wherein the taggant of the tagged well treatment agent of the first well treatment fluid and/or the taggant of the tagged well treatment agent of the second well treatment fluid is a chelate.

13. A method of determining the source of a fluid transported from a well penetrating a multi-zone subterranean formation comprising:
(a) introducing into two or more of the multiple zones a well treatment fluid containing a composite comprising a well treatment agent having a taggant joined thereto wherein (i) the well treatment agent is a scale inhibitor, paraffin inhibitor, corrosion inhibitor, salt inhibitor, gas hydrate inhibitor or asphaltene inhibitor; (ii) the size of the taggant is between from about 0.001 microns to about 100 microns; (iii) the taggant of the tagged well treatment agent of the composite introduced to each of the two or more multiple zones is different; and (iv) wherein the tagged well treatment agent is adsorbed onto a water-insoluble adsorbent;
(b) collecting at least a portion of fluid transported from the well during or after completion of a well treatment operation; and
(c) determining the zone of the subterranean formation from which the transported fluid originates by detecting the taggant of the tagged well treatment agent in the transported fluid by a physical or a chemical detection method.

14. The method of claim 13, wherein at least one of the following prevails:
(a) the composite introduced into at least one of the two or more multiple zones comprises the tagged well treatment agent adsorbed onto a water-insoluble adsorbent;
(b) the composite introduced into at least one of the two or more multiple zones comprises the tagged well treatment agent immobilized on a support;
(c) the composite introduced into at least one of the two or more multiple zones comprises the tagged well treatment agent immobilized within a matrix; or
(d) the composite introduced into at least one of the two or more multiple zones comprises the tagged well treatment agent immobilized on or within a porous particulate.

15. The method of claim 13, wherein at least one of the following conditions prevail:
(a) the transported fluid is flowback water and the zone of the subterranean formation from which the flowback water originates is determined by comparing the taggant of the tagged well treatment agent in the flowback water by a physical or a chemical detection method;
(b) the transported fluid is produced water and the zone of the subterranean formation from which the produced water originates is determined by comparing the taggant of the tagged well treatment agent in the produced water by a physical or chemical detection method; or
(c) the transported fluid is gas or oil produced from the subterranean formation and further wherein the zone of the subterranean formation from which the produced gas or oil originates is determined detecting the taggant of the tagged well treatment agent by a physical or chemical detection method.

16. A method of inhibiting or preventing the deposition of contaminants within a subterranean formation or a well penetrating the subterranean formation and determining the source of a fluid transported from a subterranean formation, wherein the subterranean formation has multiple zones penetrated by the well, the method comprising:
   (a) introducing into two or more of the multiple zones a composite comprising a well treatment agent having a taggant bonded to or complexed with the well treatment agent and wherein the tagged well treatment agent is adsorbed onto a water-insoluble adsorbent and further wherein the taggant bonded to or complexed with the well treatment agent introduced into each of the two or more multiple zones is different;
   (b) inhibiting or prevent the deposition of contaminants in the subterranean formation and/or well by disassociating the tagged well treatment agent from the water-insoluble adsorbent under in-situ conditions;
   (c) collecting at least a portion of fluid transported from the well during or after completion of a well treatment operation, wherein the collected fluid contains the disassociated tagged well treatment agent; and
   (d) determining the zone of the subterranean formation from which the transported fluid originated by detecting the taggant of the tagged well treatment agent in the transported fluid by a chemical or physical method.

17. The method of claim 16, wherein at least one of the following conditions prevail:
   (a) the transported fluid is flowback water and the zone of the subterranean formation from which the flowback water originated is determined by detecting the taggant of the tagged well treatment agent in the flowback water by a physical or a chemical detection method;
   (b) the transported fluid is produced water and the zone of the subterranean formation from which the produced water originated is determined by detecting the taggant of the tagged well treatment agent in the produced water by a physical or chemical detection method;
   (c) the transported fluid is gas or oil produced from the subterranean formation and further wherein the zone of the subterranean formation from which the produced gas or oil originated is determined by detecting the taggant of the tagged well treatment agent in the produced gas or oil by a physical or chemical detection method.

18. The method of claim 13, wherein the well treatment agent of the tagged well treatment agent is a liquid.

19. The method of claim 13, wherein the tagged well treatment agent of the first well treatment fluid and the tagged well treatment agent of the second well treatment fluid differ only by the taggant.

20. The method of claim 15, wherein the well treatment agent of the tagged well treatment agent is selected from the group consisting of corrosion inhibitors, scale inhibitors, paraffin inhibitors, gas hydrate inhibitors, salt formation inhibitors and asphaltene dispersants.

21. The method of claim 13, wherein the well treatment agent of the tagged well treatment agent of the composite of the first well treatment fluid and the well treatment agent of the tagged well treatment agent of the composite of the second well treatment fluid are different.

22. The method of claim 16, wherein the well treatment agent of the tagged well treatment agent of the composite of the first well treatment fluid and the well treatment agent of the tagged well treatment agent of the composite of the second well treatment fluid are different.

23. The method of claim 16, wherein the well treatment agent of the tagged well treatment agent of the first well treatment fluid and/or the second well treatment fluid is a scale inhibitor or salt inhibitor.

24. The method of claim 1, wherein the well treatment agent of the tagged well treatment agent of the first well treatment fluid and/or the second well treatment fluid is a liquid.

* * * * *

UNITED STATES PATENT AND TRADEMARK OFFICE
CERTIFICATE OF CORRECTION

PATENT NO. : 10,641,083 B2
APPLICATION NO. : 15/172015
DATED : May 5, 2020
INVENTOR(S) : Doug Shen et al.

Page 1 of 1

It is certified that error appears in the above-identified patent and that said Letters Patent is hereby corrected as shown below:

In the Claims

Column 19, Line 56:
"determines" should be replaced with --determined--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*